United States Patent
Johnstone

Patent Number: 5,297,055
Date of Patent: Mar. 22, 1994

[54] MULTI-FUNCTIONAL MEASUREMENT SYSTEM

[75] Inventor: Richard Johnstone, Fairport, N.Y.

[73] Assignee: The Gleason Works, Rochester, N.Y.

[21] Appl. No.: 513,309

[22] Filed: Apr. 20, 1990

[51] Int. Cl.[5] .............................................. G05B 19/19
[52] U.S. Cl. ................................................... 364/474.37
[58] Field of Search .................. 364/474.37, 474.01, 364/474.28, 474.34

[56] References Cited

U.S. PATENT DOCUMENTS

| | | | |
|---|---|---|---|
| 3,522,524 | 8/1970 | Smith et al. | 324/200 |
| 3,942,254 | 3/1976 | Thompson et al. | |
| 4,001,556 | 1/1977 | Folchi et al. | 395/93 |
| 4,166,323 | 9/1979 | Maag . | |
| 4,181,958 | 1/1980 | Juengel et al. | 364/560 |
| 4,382,215 | 5/1983 | Barlow et al. | 318/568 |
| 4,437,151 | 3/1984 | Hurt et al. | 364/571 |
| 4,631,870 | 12/1986 | Sun | 364/474.06 |
| 4,704,799 | 11/1987 | Kobetsky | 33/179.5 R |
| 4,755,950 | 7/1988 | Rao | 364/474 |
| 4,778,313 | 10/1988 | Lehmkuhl | 409/127 |
| 4,779,319 | 10/1988 | Juengel | 29/57 |
| 4,796,195 | 1/1989 | Haggerty | 364/474.35 |
| 4,816,729 | 3/1989 | Carlson | 318/568 |
| 4,866,643 | 9/1989 | Dutler | 364/474.37 X |
| 4,901,256 | 2/1990 | McMurtry et al. | 364/474.37 X |
| 4,908,951 | 3/1990 | Gurny . | |
| 4,974,165 | 11/1990 | Locke et al. | 364/474.37 X |

FOREIGN PATENT DOCUMENTS

| | | |
|---|---|---|
| WO89/01838 | 3/1989 | PCT Int'l Appl. . |
| 2005577A | 4/1979 | United Kingdom . |
| 2197478 | 5/1988 | United Kingdom . |

*Primary Examiner*—Robert W. Beausoliel, Jr.
*Assistant Examiner*—Allen Lo
*Attorney, Agent, or Firm*—Robert L. McDowell; Ralph E. Harper

[57] ABSTRACT

A multi-purpose probe module 82, comprising both a touch-trigger type contact probe 84 and a non-contact type probe 86, is used in method and apparatus for monitoring and adjusting the accuracy of a computer-controlled machine for manufacturing precision bevel and hypoid gears. The probe module is mounted on the machine's tool support and is used in conjunction with locating points positioned on the machine's work support to monitor and recalibrate the relative positions of the tool and work supports. The probe module is also used to monitor the flanks of the gear-shaped workpieces (a) for initial stock division, (b) for pre-machining accuracy, (c) for first-piece testing, (d) for in-process accuracy, and (e) for post-machining accuracy. The same probe module is used in combination with a sacrificial test wafer mounted on the work support for adjusting the position of the machine's cup-shaped grinding wheel following each dressing of the latter's working surfaces.

21 Claims, 7 Drawing Sheets

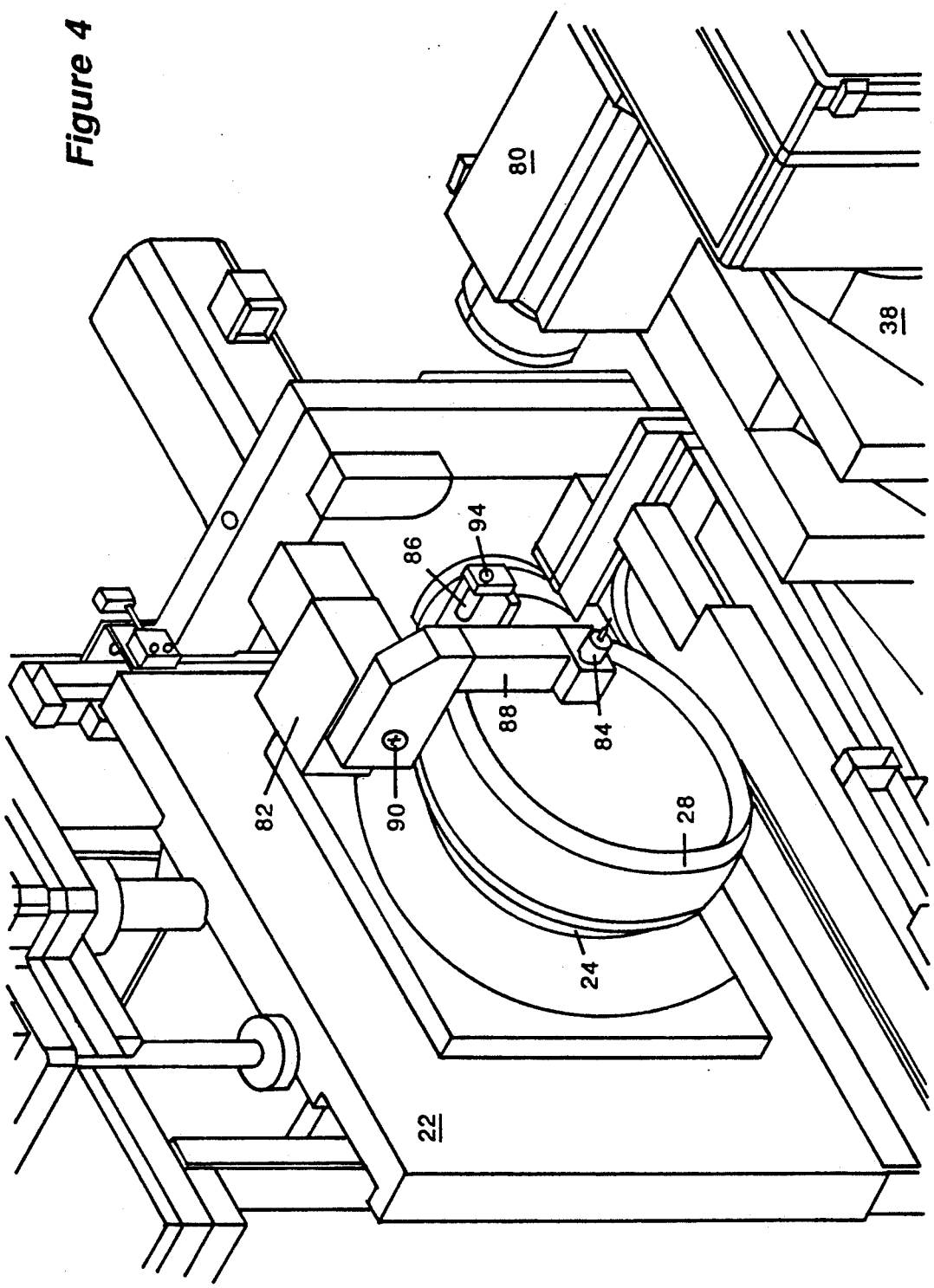

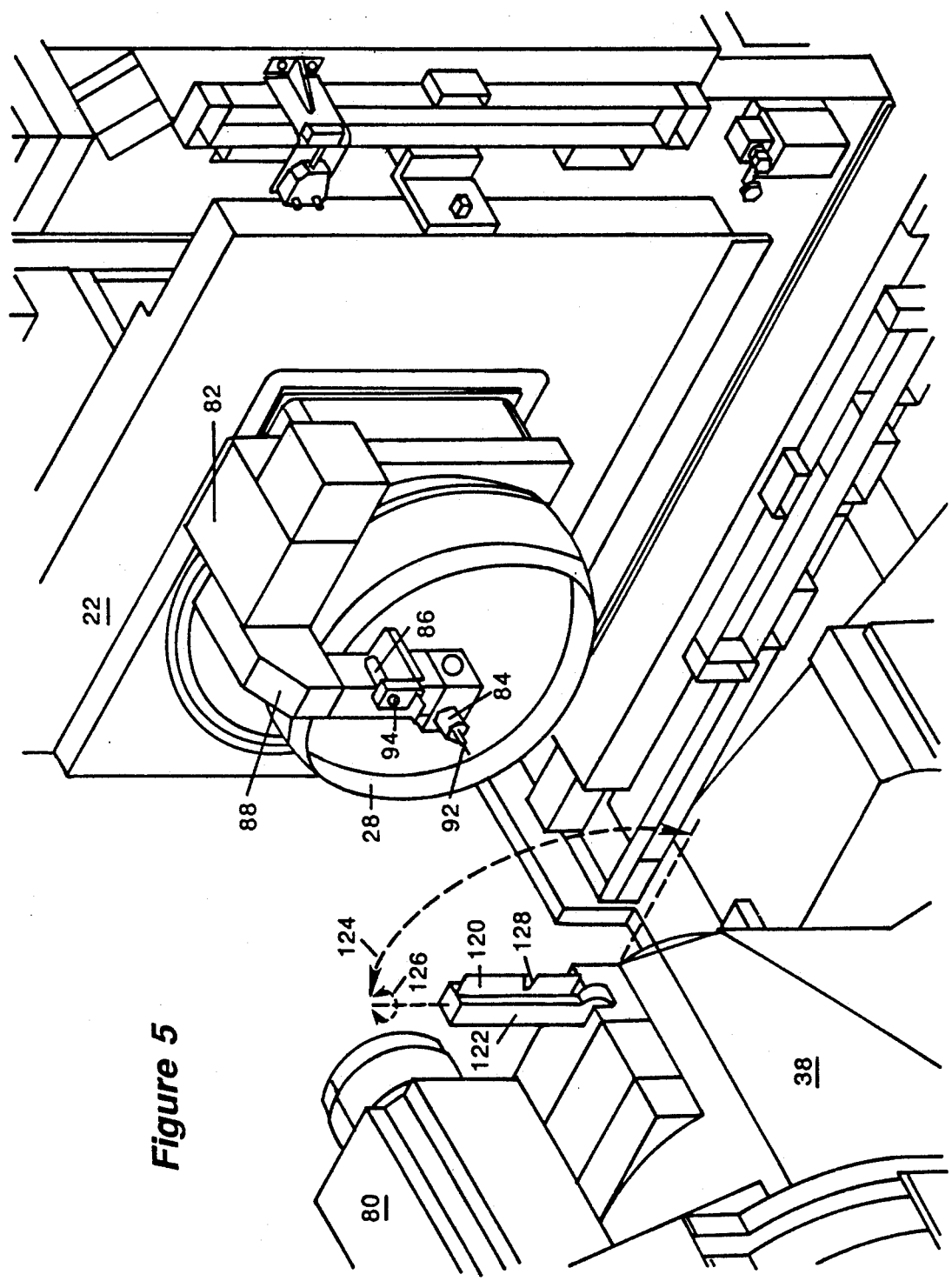

MULTI-FUNCTIONAL MEASUREMENT SYSTEM

TECHNICAL FIELD

This invention relates to apparatus and methods for monitoring the accuracy of a machine tool for manufacturing bevel and hypoid gears, and for measuring the accuracy of bevel and hypoid gear workpieces being manufactured on such machines.

BACKGROUND

The high-speed power trains of performance cars and aircraft often require the use of precision bevel and/or hypoid gears. Such precision gears are presently manufactured by a long and careful process which begins with the manufacture of a roughed gear workpiece, the teeth of this roughed gear having flanks which are only a few thousandths of an inch (less than 0.1 mm) larger than its desired dimensions when finished. This roughed workpiece is heat-treated to harden the surfaces of the teeth, and then it is finished in the following manner: (a) a finishing machine is set up to grind the roughed teeth to their final shape; (b) prior to being mounted on the finishing machine, each roughed workpiece is checked for serious nicks, burrs, or extreme dimensional errors that might prevent proper finishing; (c) the first roughed workpiece of each heat-treated lot is mounted on the finishing machine and finished; (d) this first gear is then removed from the finishing machine and sent to a test machine where its accuracy is carefully checked; (e) the setup of the finishing machine is then modified in accordance to the findings of the test; (f) the tested first gear is then returned to the machine and refinished using the corrected settings; and (g) the refinished first part is removed and retested. In many instances, steps (d) through (g) may have to be repeated several times before machine settings produce an acceptably-shaped gear. When the shape of the test part is deemed acceptable, the remaining gears in each heat-treated lot are then ground, each being given pre-machining and post-machining checks. Further, during the processing of the remaining gears in the lot, the post-machining dimensions of the finished gears is monitored and the setup of the machine is modified as necessary to adjust for any accuracy variations due to thermal changes, etc.

Of course, each time a workpiece is mounted or remounted on the machine tool, it must be stock divided (i.e., the grinding or cutting tool must be appropriately positioned relative to the pre-cut teeth on the workpiece). Such stock division is usually done by an operator when precision gears are being finished. There are also known automatic stock division systems. Some of these known systems use non-contact probes to sense the position of the flanks of the teeth of the gear-shaped workpiece. However, since these non-contact systems are not considered accurate enough for precision gear finishing operations, contact-type probes are often used instead for automatic stock division. Accurate stock division requires that the flanks of several teeth be measured, and such multiple measurements by a contact probe is quite time-consuming.

During the finishing process, the grinding wheel (which is used to shape the teeth of the workpiece) must be dressed at regular intervals to assure its accuracy and to maintain an appropriately sharp grinding surface. However, each time the wheel is dressed, its size and shape is altered, and so the machine's tool and work supports must be carefully reset after each such dressing operation to assure that the grinding wheel is accurately positioned relative to the workpiece before further grinding operations are initiated.

It can be appreciated that this multiple handling and testing takes considerable time and requires expert machine operators, and therefore, that each precision gear is a relatively expensive product.

The machines presently used for finishing bevel and hypoid gears are quite complex, the grinding wheel or cutting tool being mounted in a spindle which itself is moved eccentrically in a rotating cradle journaled in the tool support. In addition, the tool spindle is often mounted in a further mechanism which tilts the spindle relative to its support to adjust the angular position of the tool axis with respect to the axis of the cradle. Such conventional bevel and hypoid gear generating machines require nine or more machine settings (also known as "setup axes") for appropriately positioning the tool with respect to the gear-shaped work workpiece, and the general orientation of the tool and work heads of these traditional machines has remained relatively unchanged for more than half a century.

However, very recently a totally new machine has been developed for manufacturing bevel and hypoid gears. This new machine is disclosed in PCT application PCT/US87/02083 and U.S. patent application Ser. No. 104,012 filed Aug. 24, 1987, and its operation is remarkably simple in comparison to the conventional machines just referred to above. Namely, while the new machine is capable of all of the complex relative motions produced by conventional machines, these motions are accomplished by moving the new machine's work and tool supports relative to each other under computer numerical control ("CNC") along or about only six axes of movement. The remarkable freedoms provided by this new machine are a definite boon to the bevel and hypoid gear manufacturing industry. Nonetheless, because the complex relative motions needed for generating these gears require that the tool and work supports of the new machine be moved simultaneously along many of the machine's multiple axes, it is important that the accuracy of these fewer axes be monitored regularly, particularly in regard to the manufacture of precision bevel and hypoid gears. Of course, such surveillance by highly trained operators takes time and is part of the expense of the complex manufacturing process described above.

My invention facilitates use of the above-identified new 6-axis machine for the manufacture of precision bevel and hypoid gears, and it is intended to increase and assure the accuracy of the gear products being produced on the new machine and, simultaneously, to reduce the time and expense of this complex manufacturing process.

SUMMARY OF INVENTION

The apparatus of the invention includes a probe module which is mounted on the tool support of the machine tool. The module includes a contact-type probe movable from a withdrawn position to an extended position in which the tip of the probe projects from the front face of the tool support. In the preferred embodiment, the probe module also includes a non-contact type probe which is similarly movable from a withdrawn position to an extended position with the sensitive face of the non-contact probe projecting from the front face of the tool support.

The same probe module is used to perform a wide variety of measurements as part of the invention's multi-functional system which (a) facilitates machine setup, (b) provides automatic workpiece stock division, (c) monitors workpiece accuracy "on-machine" for pre-machining, in-process and post-machining testing, and also (d) recalibrates the machine itself.

As part of the apparatus of my invention, special locating pads are positioned at a plurality of locations on the side and front faces of the work support unit and on the work spindle unit which is mounted in the work support. The probe module is integrated with the machine tool's CNC system which is programmed, according to the method of my invention, to move the machine tool's work and tool supports to a plurality of test positions in a serial manner. In each of these serial test positions, the tip of the contact probe is brought into contact with various ones of the locating pads, and the positions of the work head and work spindle relative to the tool is noted in each test position. These testing procedures are repeated from time to time as deemed necessary, the position information generated by these test procedures being used to update and correct calibration of the machine's operations.

When the probe module of my invention is used to provide automatic stock division of the workpiece, both the non-contact probe and the contact probe are used in combination to provide accuracy comparable to that achieved by prior art contact probe systems but at much faster speeds, thus reducing the time and cost of the necessary stock division procedures of the precision gear finishing process. Namely, my stock division system first uses the non-contact probe to measure very quickly the position of all of the tooth flanks. These measurements are then compared to predetermined or theoretically correct measurements to indicate which tooth slots appear to have the greatest errors. The contact probe is then programmed to make very accurate measurements of only these "worst case" flanks, and these accurate measurements are used to adjust the machine prior to initiation of the finishing grind in much less time than is required by prior art systems. Of course, should such measurements indicate flanks which appear to be incorrectably erroneous, the workpiece is rejected.

Among the recalibration procedures of my invention, the probe module is also used in conjunction with a sacrificial test wafer to provide automatic re-positioning of the cup-shaped grinding wheel relative to the workpiece following each dressing of the grinding wheel. The test wafer is a thin strip of relatively soft steel, and the newly-dressed grinding wheel is brought into contact with it and plunged to a predetermined depth, forming a cut in the wafer representative of the profile of the working surfaces of the grinding wheel. The contact probe is then moved into contact with the surfaces of the cut to indicate the exact position of the newly-dressed surface of the grinding wheel. This new position information is used to reset the grinding wheel tool relative to the workpiece.

Further, in addition to pre-machining, in-process and post-machining checks on the accuracy of the workpieces being processed, my invention uses the probe module as well for the "first part" testing procedures necessary to proper initial machine setup. All of these part-checking activities are accomplished without removing the workpiece from the machine, and this "on-machine" testing of the workpiece saves hours of valuable process time.

Therefore, it can be appreciated that the invention disclosed herein greatly enhances the accuracy of the gear finishing process and, at the same time, substantially reduces the time and cost involved in the manufacture of precision bevel and hypoid gears.

DRAWINGS

FIG. 4 is an enlarged perspective view of a portion of the machine shown in FIGS. 1 and 2 illustrating the probe module of the invention (which was omitted in FIGS. 1 and 2), both the contact and non-contact probes of the module being shown in their extended position;

FIG. 5 is a view similar to FIG. 4 but from a different perspective and also showing a sacrificial test wafer (omitted in FIGS. 1 and 2) mounted on the machine tool's work spindle, the test wafer being shown in its withdrawn position;

Figure 7:
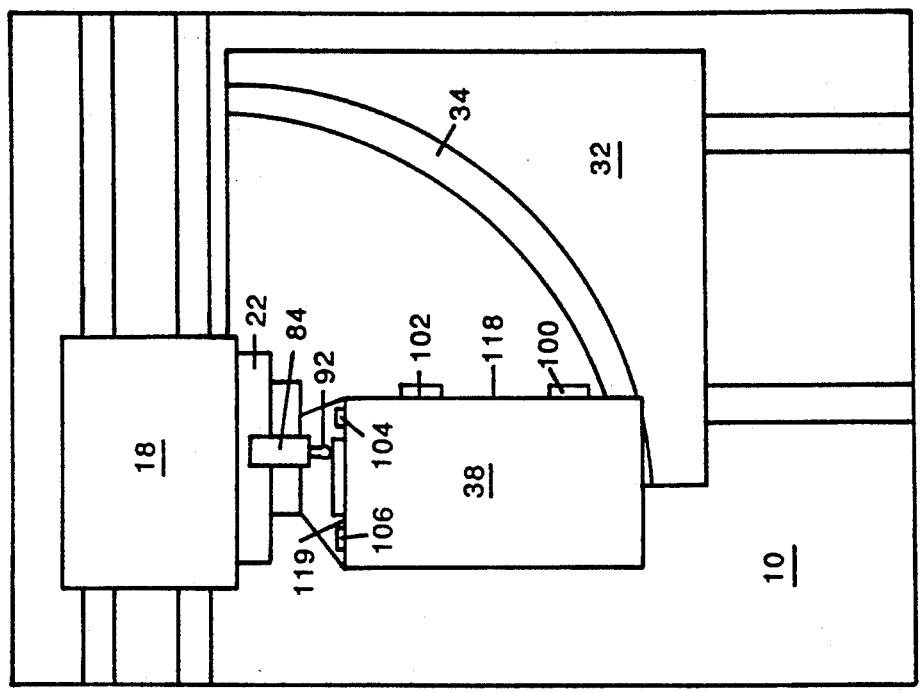
Figure 8:
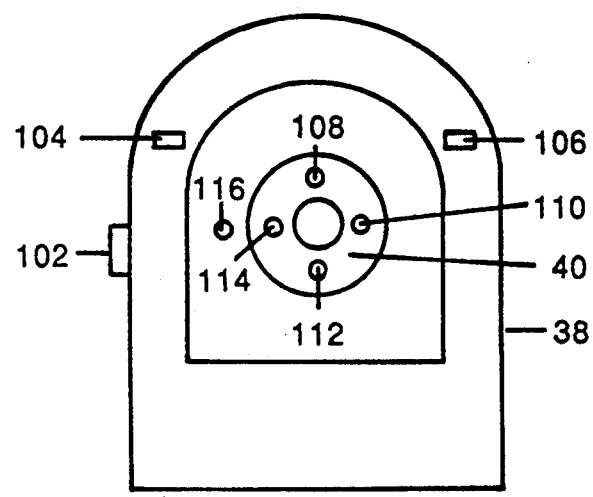

FIG. 7 is another schematic plan view of the machine showing the tool and work supports in another of the serial test positions according to the invention with the tip of the probe in contact with a locating point positioned on the face of the work spindle; and FIG. 8 is a schematic front view of the machine's work support head showing the position of locating points on both the front face of the work support and on the work spindle mounted in the work support.

DETAILED DESCRIPTION OF PREFERRED EMBODIMENTS

Figure 1:
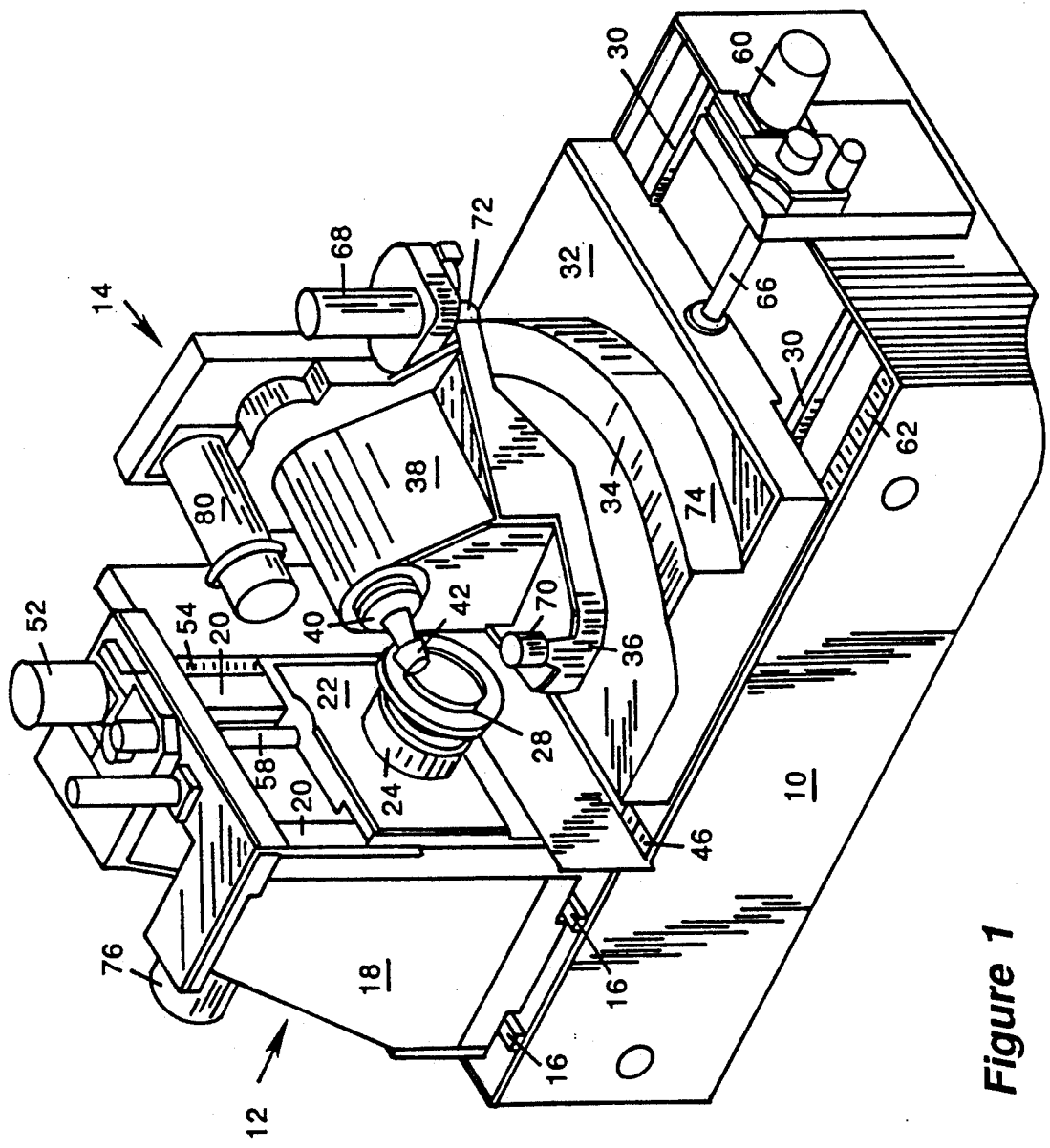
FIG. 1 is a perspective view of the type of new gear manufacturing machine for which the present invention is intended, the apparatus of the invention being omitted in this view for clarity.
Figure 2:
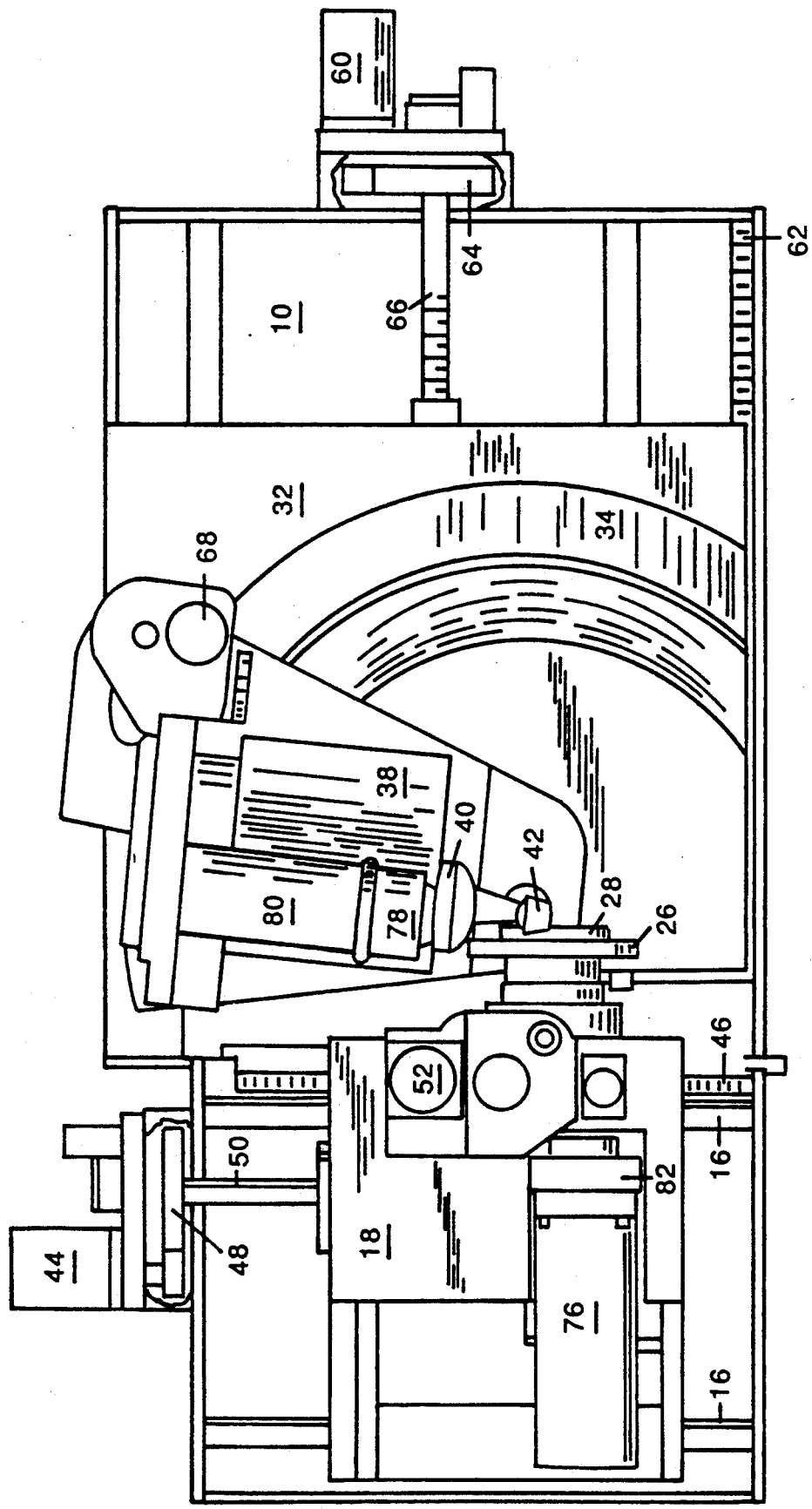
FIG. 2 is a plan view of the machine shown in FIG. 1.

FIGS. 1 and 2 show, respectively, perspective and top views of a multi-axis machine tool for the generating manufacture of bevel and hypoid gears similar to that disclosed in PCT application PCT/US87/02083 and U.S. Pat. application Ser. No. 104,012 filed Aug. 24, 1987. The machine has a base 10 on which are mounted tool support apparatus 12 and work support apparatus 14. The tool support 12 comprises a carriage 18 mounted on slide 16 formed in base 10 to permit rectilinear movement of carriage 18 across the width of base 10. A tool head 22 is carried on slides 20 in carriage 18 to permit movement of tool head 22 vertically with respect to the base. A tool spindle 24 is journaled in tool head 22 for rotatively mounting a rotary tool having stock-removing surfaces projecting from a front face of the tool. As illustrated in this disclosure, the rotary tool is a cup-shaped grinding wheel 28 but, as is well known in the art, it can also be a multi-bladed face-mill cutter or face hob. (NOTE: Also mounted on tool head 22, but omitted in FIGS. 1 and 2, is a probe module which is shown in FIGS. 4 and 5 and described below.)

Work support 14 includes a table 32 which is mounted on slides 30 formed in base 10 to permit movement of table 32 along the length of the base. A work head 38 is mounted on arcuate slide 34 and pivot 36 on table 32 to permit arcuate movement of work head 38 about pivot 36. A work spindle 40 is journaled in work head 38 for rotatively mounting a gear workpiece 42 which, for purposes of this disclosure, is a rough-cut bevel or hypoid gear being ground to a finished shape. (NOTE: Also mounted on work support 14, but omitted in FIGS. 1 and 2, is a sacrificial test wafer which is shown in FIG. 5 and described below.)

Figure 3:
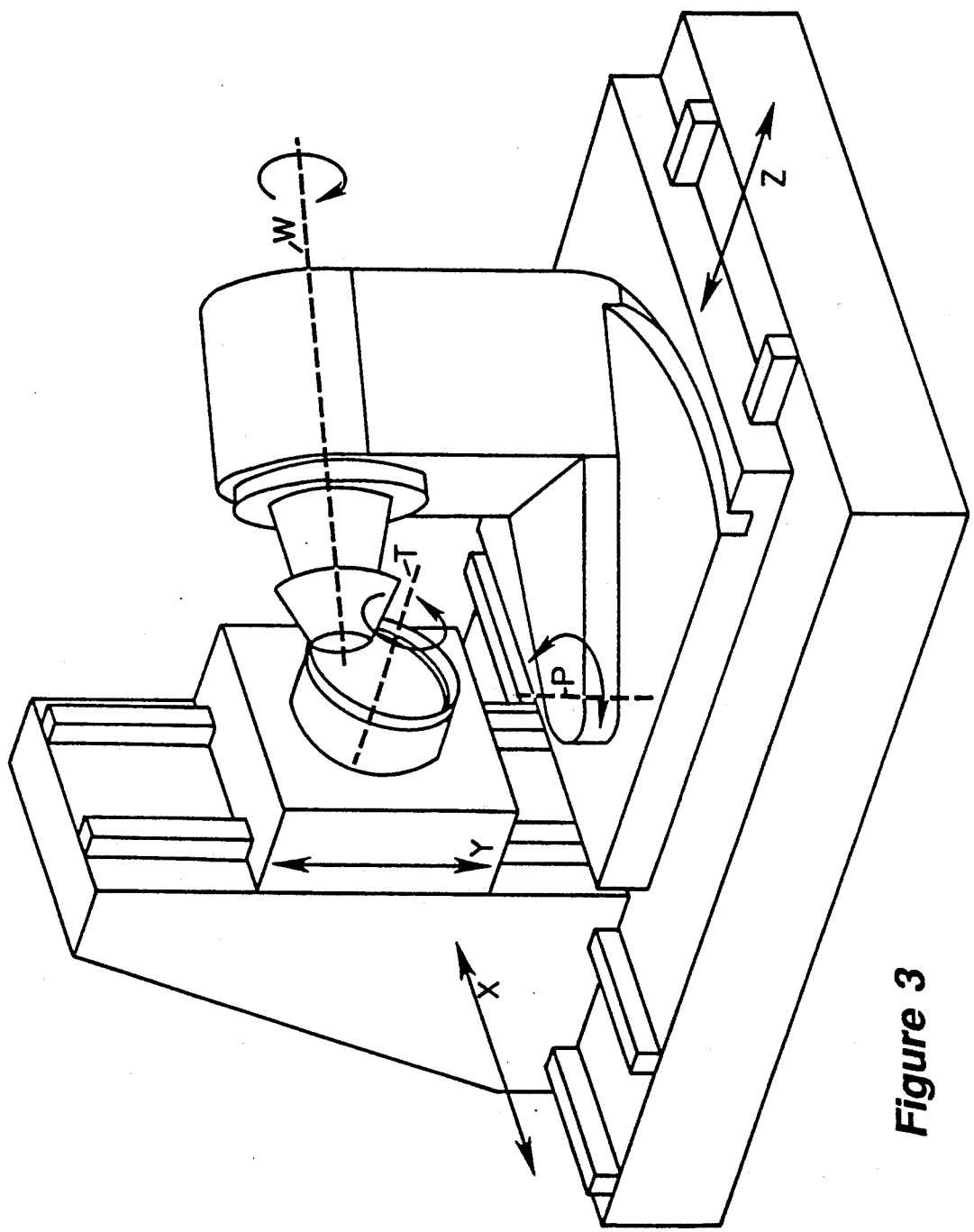
FIG. 3 is a schematic depiction of the machine shown in FIGS. 1 and 2 with the movable structures of the machine greatly simplified to facilitate understanding of the axes of machine movement.

Reference is made to FIG. 3 to permit a clearer understanding of the relative machine motions which are used (a) for all generating operations, (b) for obtaining measurements used for recalibrating the machine, and (c) for monitoring the accuracy of gears being finished on the machine. FIG. 3 schematically illustrates the minimal number of axes which are used to carry out all of these machine operations.

It can be seen from FIG. 3 that tool axis "T" and work axis "W" are movable relative to each other along three rectilinear axes "X", "Y", and "Z", and about one pivot axis "P". Axes X, Y, and Z are mutually orthogonal. Work axis W is pivotable about pivot axis P which extends in direction Y perpendicular to both work axis W and tool axis T. Although separated for clarity of illustration, pivot axis P intersects work axis W in a position along axis W in the vicinity of workpiece 42. Grinding wheel 28 and workpiece 42 are each rotatable about their associated axes T and W which pass through the respective centers of the tool and workpiece.

Comparing the schematic representation of FIG. 3 to FIGS. 1 and 2, it may now be understood that axes T and W correspond to the axes of rotation of grinding wheel 28 and workpiece 42 on tool spindle 24 and work spindle 40, respectively. Movement of carriage 18 across the width of base 10 corresponds to movement of tool axis T in direction X. Similarly, movement of tool head 22 vertical of the base, and movement of work head 38 along the length of the base, correspond respectively to movements of tool axis T in direction Y and work axis W in direction Z. Pivot axis P may be understood to extend through pivot 36 on table 32 in a direction parallel to the movement of tool head 22 in direction Y.

Rectilinear movement of tool support 12 and work support 14 is imparted by respective drive motors which act through speed reducing gearing and recirculating ball screw drives. For example, movement of table 32 in direction Z along the length of the base is imparted by drive motor 60 which is operatively connected to threaded ball screw 66 through reduction 64. In accordance with conventional practices, ball screw 66 is threadably engaged with a ball nut (not shown) which is captured in table 32. Threaded ball screw 66 is secured axially to base 10 and its rotation is transformed by the ball nut into a rectilinear movement of table 32.

Similarly, rectilinear movement of carriage 18 in direction X is imparted by drive motor 44 acting through reduction gearing 48 and ball screw 50. Tool head 22 is moved in direction Y by drive motor 52, reduction gearing (not shown) and ball screw 58. Arcuate motion of work head 38 is imparted by drive motor 68 acting through friction wheel 72 which contacts outer surface 74 of slide 34 which partly encircles pivot 36 at a fixed radial distance. The axis of friction wheel 72 is fixed to work head 38 and rotation of the friction wheel in contact with outer surface 74 of slide 34 advances one end of the work head around pivot 36. Drive motors 76 and 80 are also provided for rotating the grinding wheel and dressing roller, respectively.

Each of the respective drive motors is associated with either a linear or rotary encoder as part of a CNC system which governs the operation of the drive motors in accordance with instructions input to a computer. The encoders provide signals to the computer concerning the actual positions of each of the movable machine axes.

For example, movement of carriage 18 on slides 16 is measured by linear encoder 46, movement of tool head 22 in slides 20 is measured by linear encoder 54, and movement of table 32 on slides 30 is measured by linear encoder 62. Arcuate movement of work head 38 about pivot 36 is measured by rotary encoder 70. Rotary encoders 78 and 82 are also provided for measuring the rotational positions of work spindle 40 and tool spindle 24, respectively.

Although the illustrated machine tool includes a particular arrangement of movable structures for relatively positioning the grinding wheel and workpiece, other arrangements may be used to provide the same freedoms of relative adjustment. For example, it would be possible to provide for moving either the work support or tool support relative to the other along any of the prescribed axes; any of the rectilinear axes could be associated with movements of the tool support or work support; and either the tool support or work support could be pivoted with respect to the other.

An appropriate CNC system (not shown) for governing the operation of the respective drive motors is provided with appropriate computer hardware and software for controlling the respective operations of the machine. Position and motion signals, translated to and from numerical measurements, can be programmed such that operation of the machine is totally automated.

Referring now to FIGS. 4 and 5, a probe module 82 is mounted on tool head 22 and carries contact probe 84 and non-contact probe 86 on an actuated arm 88. Contact probe 84 is of the known "touch trigger" type (i.e., as in U.S. Pat. No. 4,755,950), having a very small ball-shaped tip 92 and emitting a trigger signal whenever tip 92 is brought into contact with another surface. Non-contact probe 86 is preferably any of the known capacitance, magnetic, or pneumatic type (e.g., as in U.S. Pat. No. 3,522,524 and U.K. 2,005,597A) having a sensitive nozzle or face portion 94 and emitting a trigger signal whenever the proximity of its face portion 94 relative to another surface results in a predetermined change in an associated capacitive, magnetic or pneumatic circuit.

Probe module 82 is illustrated with probes 84 and 86 in their extended position in which the tip 92 and sensitive face portion 94 of the respective probes extend beyond the front face of tool head 22 and beyond the front edge of grinding wheel 28. Articulated probe arm 88 is rotatable about axis 90 to swing the probes into a withdrawn position when they are not being used.

Figure 6:
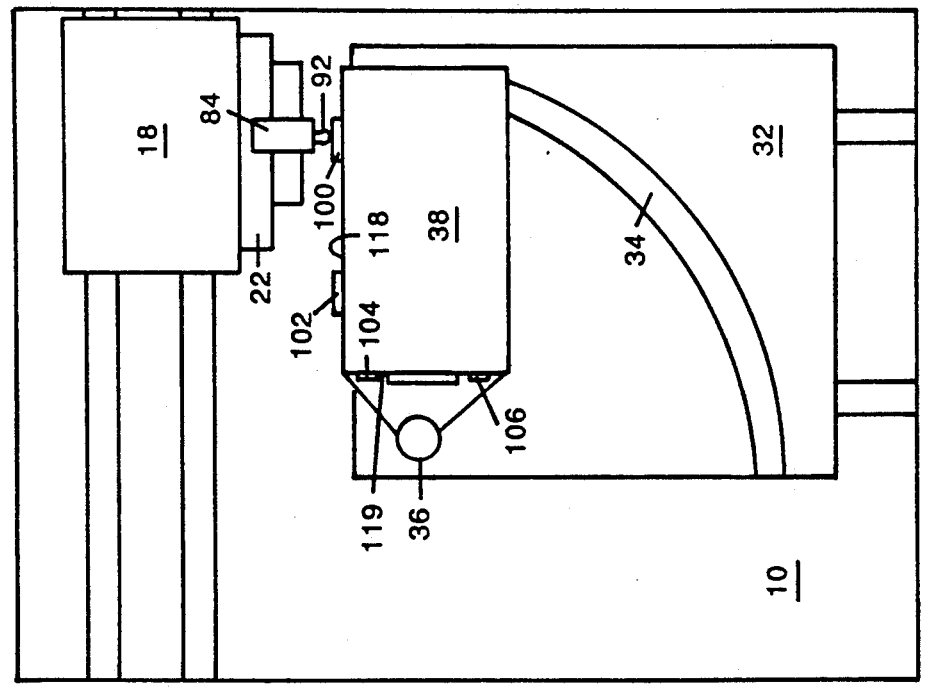
FIG. 6 is a schematic plan view of the machine with the tool and work supports in one of the serial test positions according to the invention with the tip of the contact probe in contact with one of the locating points on the side face of the work support.

Referring next to FIGS. 6, 7 and 8, a plurality of locating points 100, 102, 104 and 106 are positioned respectively on the side face 118 and front face 119 of work head 38. While these locating points are illustrated as being positioned on pads extending above the front and side surfaces of work head 38, in actual practice they may be no more than specially prepared and accurately positioned plane surfaces on the surface of the work head casting.

The locating points are used in cooperation with contact probe 84 to periodically check the coordinate datums and the geometric relationships of the machine axes for purposes of recalibrating machine settings to compensate for thermally and frictionally engendered errors. For instance, accuracy of the angular position of work head 38, as it is moved around pivot 36 and along slide 34, is checked by serial test procedures in which the work head 38 is first moved to its "0-degree" position (as illustrated in FIG. 6) and, thereafter, to its "9-degree" position (as shown in FIG. 7). The accuracy of each of these respective positions being determined by bringing the tip 92 of contact probe 84 into contact with locating points 100 and 102 (for the "0-degree" position) and locating points 104 and 106 (for the "90-degree" position). It should be understood that carriage 18 and work table 32, as well as tool head 22, are moved along their respective X, Y, and Z axes to bring probe 84 into contact, serially, with the respective locating points.

At the moment tip 92 contacts each of the respective points, a trigger signal is sent from probe module 82 to the machine's CNC system, and the system stores the instantaneous encoder readings for each of the axes at the moment the trigger pulse is received. These instantaneous position signals are then compared with predetermined position signals for each of the axes relative to the locating pad being monitored, and error signals are generated indicative of any differences between the instantaneous and predetermined sets of position signals. These sets of error signals are then used to recalibrate the 0-degree position and the 90-degree position of work head 38 and to recalibrate the distance value represented by each unit of angular motion generated by rotary encoder 70.

The X-axis and Y-axis accuracy of work spindle 40 is checked and recalibrated by using contact probe 84 in conjunction with locating points 108, 110, 112, and 114. In FIG. 8, these points are shown positioned, respectively, at cardinal points about the bore of spindle 40. However, it should be particularly noted that when workpiece chucking apparatus is appropriately mounted in the spindle bore, then points 108, 110, 112 and 114 are similarly positioned, respectively, within the bore of a collet-type chuck or on the outside diameter of an arbor-type chuck. A further locating point 116, positioned on the face of the spindle housing, is used to calibrate the Z-axis position of the spindle.

The various calibration procedures which have just been described are programmed serially in any order which may be appropriate or desirable. The entire recalibration procedure is repeated from time to time during the manufacture of successive workpieces, and/or only portions of the recalibration procedure may be used at any given time. For instance, during periods when the machine or its environment may be experiencing unusual temperature changes, the operator selects programs in which the recalibration procedures are automatically repeated more often than usual to assure that accuracy is not being lost due to excessive thermal changes in the machine. At such special times, machine recalibration may be repeated several times during the finishing of a single workpiece, should that be considered necessary.

According to the invention, probe module 82 is also used for the automatic stock division of the gear workpieces when they are initially loaded on work spindle 40. To accomplish such stock division, articulated arm 88 is moved to the position shown in FIGS. 4 and 5 with tip 92 and sensitive face portion 94 of the probes extended in front of grinding wheel 28. The tool and work supports of the machine are then adjusted to a position similar to that shown in FIGS. 1 and 2 except probe arm 88 is positioned between the tool and workpiece. First, sensitive face portion 94 of non-contact probe 86 is moved into relatively close proximity to the surfaces of gear shaped workpiece 42, and spindle 40 is rotated to move the teeth of workpiece 42 past face portion 94 of non-contact probe 86. As the flank of each successive tooth passes within a predetermined distance of face portion 94, non-contact probe 86 emits a trigger signal, and the CNC system records the position of encoder 78 indicating the instantaneous angular position of spindle 40 as each flank passes. These instantaneously generated angular positions of spindle 40 are translated into appropriate numerical measurement signals and then compared to similar numerical signals which have been previously stored in the machine's computer system, these previously-stored signals representing the predetermined positions of the tooth flanks of a properly-sized workpiece. Based upon this comparison, the computer generates error signals for each respective tooth flank of workpiece 42. The position of the individual flanks showing the greatest error is noted, and then the work and tool supports are adjusted to bring contact probe 84 into contact with the surface of preselected ones of those "worst case" flanks (i.e., those surfaces having the greatest error).

In the course of this just-described stock division procedure, the CNC system also compares the generated error signals with predetermined limits stored in the computer memory. Should the error signal for any flank exceed the predetermined limit, indicating that it may not be possible to correct the error during finishing, the process is aborted and the workpiece is rejected. Such an incorrectable error might be a tooth flank which has less stock than that required for the finished gear, or one which has more stock than can be safely removed by the finishing tool, etc.

Non-contact probe 86 provides its measurements very quickly, namely, within the time it takes spindle 40 to make one relatively fast revolution, and the position signals triggered by probe 86 provide a valid and practical record of the relative measurements of each of the various tooth flanks. It should be noted however, that with probes presently available for commercial use, the measurements made by contact probe 84 are more accurate by a full order of magnitude than those provided by non-contact probe 86. Nonetheless, if each flank of workpiece 42 were to be measured by contact probe 84, such measurements would take tens of minutes, while the measurements by non-contact probe 86 are obtained within a few seconds. Therefore, by combining the use of both probes, the invention greatly reduces the time required for stock division but still utilizes the greater accuracy of the contact probe for the final precision measurements used to position the workpiece relative to the tool.

According to the invention, the machine's CNC system is also programmed to utilize probe module 82 for purposes of pre-machining, in-process and post-machining inspection of the workpiece tooth flanks. Such programmed inspections can be carried out (a) using probe 84 to contact one or more preselected points on a plurality of, or all, flanks of the workpiece, or (b) in a manner similar to that just described in relation to stock division, using non-contact probe 86, to initially determine the "worst case" tooth flanks, and then contact probe 84, to provide a very accurate measurement of those particular tooth flanks having more or less stock than the predetermined ideal measurements for a precision gear.

While the automatic stock division and tooth flank measurement procedures and apparatus of the invention have been described in conjunction with a bevel and hypoid gear finishing machine, it will be understood that these aspects of the invention are similarly applicable to the stock division and tooth flank measurement of all types of gear-shaped workpieces, including spur and helical gears as well.

It will be understood by persons skilled in the art that the working surfaces of cup-shaped grinding wheel 28 must be periodically dressed. This is accomplished automatically by known apparatus such as that indicated generally at 119 in FIGS. 4 and 5 (not shown in FIGS. 1-3). Such dressing operations change the size and shape of the working surfaces of the wheel and necessitate that the relative position between grinding wheel 28 and workpiece 42 be reset following each such dressing. To automate this resetting operation, while maintaining the accuracies needed for precision gear manufacture, a sacrificial wafer 120 (FIG. 5) is mounted in a bar 122 which is shown in its withdrawn position. Following each dressing of grinding wheel 28, mounting bar 122 is moved 90 degrees in the direction of arrow 124 and then rotated as indicated by arrow 126. This places wafer 120 in position to be contacted by the working surfaces of grinding wheel 28 which is then plunged (relatively along the Z-axis) a predetermined distance to produce a cut 128 in the surface of the wafer. Next, wheel 28 is withdrawn, probe arm 88 is articulated to bring contact probe 84 to its extended position, and tip 92 of probe 84 is brought into contact with the surface of cut 128, providing position readings of the exact location of the surface of cut 128. These readings are compared to similarly-generated, previous readings to indicate any changes in the profile and size of the working surfaces of grinding wheel 28 resulting from the dressing operation.

It will be understood that the various measurement procedures disclosed above may be programmed by the machine operator to take place in any particular order and prior to, or following, any of the various operations necessary to the loading, testing, and finishing of precision work pieces.

What is claimed

1. A method for monitoring the operations of a machine for manufacturing bevel and hypoid gears, said machine being computer controlled and having a tool support with a spindle mounted in its front face for rotatably holding a tool for shaping teeth on a workpiece rotatably held in a work spindle mounted in the front face of a work support, said work support also having a side face and both said supports being movable relative to each other along a minimum number of operational axes, namely, three mutually orthogonal rectilinear axes and one pivot axis, said machine also having a plurality of encoder means associated with machine drive means for moving said supports, said encoder means providing respective measurement signals indicative of the positions of said supports relative to each other; said method comprising the steps of
mounting a contact probe on said tool support so that a sensitive tip associated with said contact probe is movable from a withdrawn position to an extended position in which the tip projects beyond the front face of the tool support and so that a contact trigger signal is produced whenever the surface of said tip contacts another surface;
positioning a plurality of locating points in predetermined locations on the side and front faces of said work support;
storing sets of predetermined position signals corresponding to the relative location of each of said locating points when said tool and work supports are in each of a plurality of predetermined relative orientations;
storing sets of instantaneous position signals provided by said encoder means and indicative of the relative location of said tool and work supports in respect to said axes whenever trigger signals are provided by said contact probe means upon contact with respective ones of said locating points;
comparing sets of said instantaneous and predetermined position signals for each of said plurality of orientations;
generating error signals based upon the difference between said respective signal sets; and
controlling the operation of said machine drive means for positioning said tool and work supports in accordance with said error signals.

2. The method of claim 1 comprising the further steps of mounting a non-contact probe on said tool support so that a sensitive face portion of said non-contact probe is movable from a withdrawn position to an extended position in which the face of said probe projects beyond the front face of said tool support and so that said non-contact probe is adjusted to provide a non-contact trigger signal whenever the face of the probe is within some predetermined distance from another surface;
storing sets of predetermined work spindle position signals corresponding to the theoretically-correct relative position of the tooth flanks of said workpiece mounted in the machine's work spindle;
storing sets of instantaneous work spindle position signals indicative of the position of said work spindle whenever trigger signals are provided by said non-contact and contact probe means, respectively, upon passage of said tooth flanks within said predetermined distance and upon contact with the surface of said tooth flanks; and
programming said computer for
comparing said sets of theoretical and instantaneous work spindle position signals corresponding to the tooth flanks of the workpiece,
generating error signals based upon differences between said tooth flank signals, and
controlling operation of said machine drive means for positioning said tool and work spindles in accordance with said tooth flank error signals for stock division of said workpiece relative to said tool and, thereafter, for shaping the teeth of said workpiece by said tool.

3. A method according to claim 2 wherein said tooth flank measuring steps are carried out in conjunction with the further step of
inspecting a workpiece after it is initially mounted on the work spindle.

4. A method according to claim 2 wherein said tooth flank measuring steps are carried out in conjunction with the further step of monitoring said workpiece after shaping has been initiated but prior to completion of the shaping process.

5. A method according to claim 2 wherein said tooth flank measuring steps are carried out in conjunction with the further step of measuring the first part of each lot of workpieces following completion of its shaping by the machine tool but prior to its removal from the work spindle.

6. A method according to claim 2 wherein said tooth flank measuring steps are carried out in conjunction with the further step of measuring each workpiece following completion of its shaping by the machine tool but prior to its removal from said work spindle.

7. The method of claim 1 wherein said tool is a cup-shaped grinding wheel and said machine also has apparatus for dressing said grinding wheel, the further steps comprising:

storing predetermined position signals corresponding to a previously-measured location of the working surface of said grinding wheel;

mounting a sacrificial test wafer on said work spindle;

controlling said machine drive means, following the dressing of said grinding wheel, to bring said wheel into contact with said test wafer to produce a shaped cut in said wafer;

moving the tip of said contact probe into contact with the surface of the cut in said wafer;

comparing the instantaneous position signals provided by said encoder means when said probe tip contacts said wafer cut with said previously stored position signals, and generating difference signals based upon said comparison, and adjusting said machine drive means in accordance with said difference signals.

8. The method of claim 1 wherein said sets of instantaneous position signals are generated by the further steps of:

positioning the contact probe so that it contacts, serially, first and second locating points positioned on the side face of said work support; and positioning said contact probe so that it contacts, serially, a plurality of locating points located on the front face of said work support.

9. The method of claim 8 comprising the further steps of positioning a plurality of locating points on surfaces of said work spindle; and positioning said contact probe so that its tip contacts, serially, each of said locating points.

10. The method of claim 9 wherein said locating points are positioned at cardinal points about the bore of said work spindle.

11. The method of claim 9 wherein a collet-type chuck is mounted in the bore of said spindle and said locating points are positioned at cardinal points about the bore of the chuck.

12. The method of claim 9 wherein an arbor-type chuck is mounted in the bore of said spindle and said locating points are positioned at cardinal points about the arbor of the chuck.

13. Monitoring apparatus for a machine for manufacturing bevel and hypoid gears, said machine being computer controlled and having a tool support with a spindle mounted in its front face for rotatably holding a tool for shaping teeth on a workpiece rotatably held in a work spindle mounted in the front face of a work support, said work support also having a side face and both said supports being movable relative to each other along a minimum number of operational axes, namely, three mutually orthogonal rectilinear axes and one pivot axis, said machine also having a plurality of encoder means associated with machine drive means for moving said supports, said encoder means providing respective measurement signals indicative of the positions of said supports relative to each other; said monitoring apparatus comprising:

contact probe means, mounted on said tool support and movable from a withdrawn position to an extended position in which a sensitive tip associated with said contact probe means projects beyond the front face of said tool support, said contact probe means providing a contact trigger signal whenever the surface of said tip contacts another surface;

a plurality of locating points positioned in predetermined locations on the side and front faces of said work support and on said work spindle;

sets of predetermined position signals corresponding to the relative location of each of said locating points when said tool and work columns are in each of a plurality of predetermined relative orientations; and sets of instantaneous position signals from said encoders indicative of the relative location of said tool and work supports in respect to said axes whenever trigger signals are provided by said contact probe means upon contact with respective ones of said locating points;

said computer being programmable for comparing sets of said instantaneous and predetermined position signals for each of said plurality of orientations;

generating error signals based upon the difference between said respective signal sets; and controlling the operation of said machine drive means for positioning said tool and work supports in accordance with said error signals.

14. The monitoring apparatus of claim 13 further comprising non-contact probe means, mounted on said tool support and movable from a withdrawn position to an extended position in which a sensitive face portion associated with said non-contact probe means projects beyond the front face of said tool support, said non-contact probe means providing a non-contact trigger signal whenever said face is within some predetermined distance from another surface; and wherein said storage means also receives and stores sets of predetermined work spindle position signals corresponding to the theoretically-correct relative position of the tooth flanks of said gear-shaped workpiece mounted in said work spindle; and sets of instantaneous work spindle position signals indicative of the position of said work spindle whenever trigger signals are provided by said non-contact and contact probe means, respectively, upon passage of said tooth flanks within said predetermined distance and upon contact with the surface of said tooth flanks;

said computer also being programmable for comparing said theoretical and instantaneous work spindle position signals corresponding to the tooth flanks of the workpiece, generating error signals based upon differences between said tooth flank signals, and controlling operation of said machine drive means for positioning said tool and work spindles in accordance with said tooth flank error signals for stock division of said workpiece relative to said tool and, thereafter, for shaping the teeth of said workpiece by said tool.

15. Monitoring apparatus of claim 13 wherein said tool is a cup-shaped grinding wheel and said machine also has apparatus for dressing said grinding wheel, wherein said storage means also receives and stores predetermined signals corresponding to previously-measured positions of the working surface of said grinding wheel, and wherein said monitoring apparatus further comprises:

a sacrificial test wafer mounted on said work spindle;

said computer also being programmable for controlling said machine drive means to bring said grinding wheel into contact with said test wafer, following the dressing of said wheel, to cut said wafer, moving the tip of said contact probe means into contact with the surface of the cut in said wafer, comparing the instantaneous position signals provided by said encoder means when said probe means tip contacts said wafer cut with said previously stored position signals, and generating difference signals based upon said comparison, and adjusting said machine drive means in accordance with said difference signals.

16. A method for measuring the tooth flanks of a gear-shaped workpiece rotatably mounted in the work spindle of a computer controlled machine having a tool support, said machine also having encoder means associated with drive means for rotating said spindle, said encoder means providing measurement signals indicative of the angular position of said spindle, said method comprising the steps of mounting a non-contact probe on said tool support so that a sensitive face portion of said non-contact probe is positioned in proximity to the surface of said workpiece tooth flanks, said non-contact probe being adjusted to provide a non-contact trigger signal whenever the face of the probe is within some predetermined distance of said tooth flank surfaces;

mounting a contact probe on said tool support so that a sensitive tip associated with said contact probe produces a contact trigger signal whenever the surface of said tip contacts a tooth flank surface of said workpiece;

storing sets of predetermined work spindle position signals corresponding to the theoretically-correct relative position of the tooth flanks of said workpiece;

storing sets of instantaneous work spindle position signals indicative of the position of said work spindle whenever trigger signals are provided by said non-contact and contact probe means, respectively, upon passage of said tooth flanks within said predetermined distance and upon contact with the surface of said tooth flanks; and programming said computer for comparing said sets of theoretical and instantaneous work spindle position signals corresponding to the tooth flanks of the workpiece, and generating error signals based upon differences between said tooth flank signals.

17. The method of claim 16 wherein the error signals generated in regard to said instantaneous position signals triggered by said non-contact probe are used to select particular tooth flanks to be contacted by said contact probe.

18. The method of claim 17 wherein said tool support is also provided with a spindle for rotatably holding a tool for shaping the tooth surfaces of said workpiece, and wherein said machine has further encoder means associated with drive means for positioning said tool support and rotating said tool spindle, said method comprising the further step of controlling operation of said drive means for positioning said tool and work spindles in accordance with said tooth flank error signals for stock division of said workpiece relative to said tool.

19. Apparatus for measuring the tooth flanks of a gear-shaped workpiece rotatably mounted in the work spindle of a computer controlled machine having a tool support, said machine also having encoder means associated with drive means for rotating said spindle, said encoder means providing measurement signals indicative of the angular position of said spindle, said apparatus comprising non-contact probe means mounted on said tool support and having a sensitive face portion positioned in proximity to the surface of said workpiece tooth flanks, said non-contact probe means providing a non-contact trigger signal whenever said face is within some predetermined distance from the surface of one of said workpiece tooth flanks;

contact probe means, mounted on said tool support and movable to a position in which a sensitive tip associated with said contact probe means provides a contact trigger signal whenever the surface of said tip contacts the surface of one of said tooth flanks;

storage means for receiving and storing sets of predetermined work spindle position signals corresponding to the theoretically-correct relative position of the tooth flanks of said gear-shaped workpiece; and sets of instantaneous work spindle position signals indicative of the position of said work spindle whenever trigger signals are provided by said non-contact and contact probe means, respectively, upon passage of said tooth flanks within said predetermined distance and upon contact with the surface of said tooth flanks;

said computer being programmable for comparing said theoretical and instantaneous work spindle position signals corresponding to the tooth flanks of the workpiece, and generating error signals based upon differences between said tooth flank signals.

20. The apparatus of claim 19 wherein the error signals generated when comparing said instantaneous position signals triggered by said non-contact probe are used to select particular tooth flanks to be contacted by said contact probe.

21. Tue apparatus of claim 20 wherein said tool support is also provided with a spindle for rotatably holding a tool for shaping the tooth surfaces of said workpiece, said machine has further encoder means associated with drive means for positioning said tool support and rotating said tool spindle, and said drive means is responsive to said computer for positioning said tool and work spindles in accordance with said tooth flank error signals for stock division of said workpiece relative to said tool.

* * * * *